UNITED STATES PATENT OFFICE.

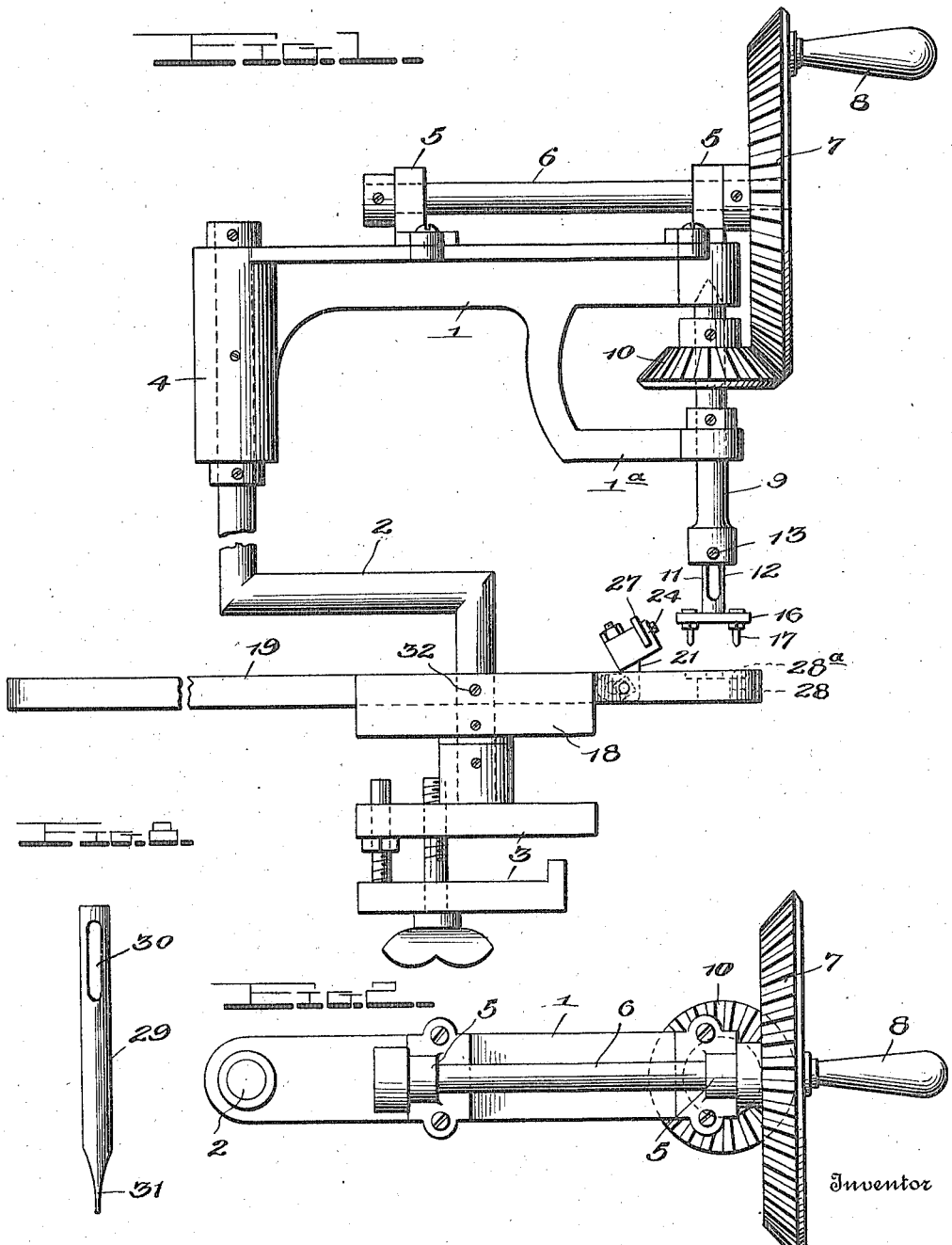

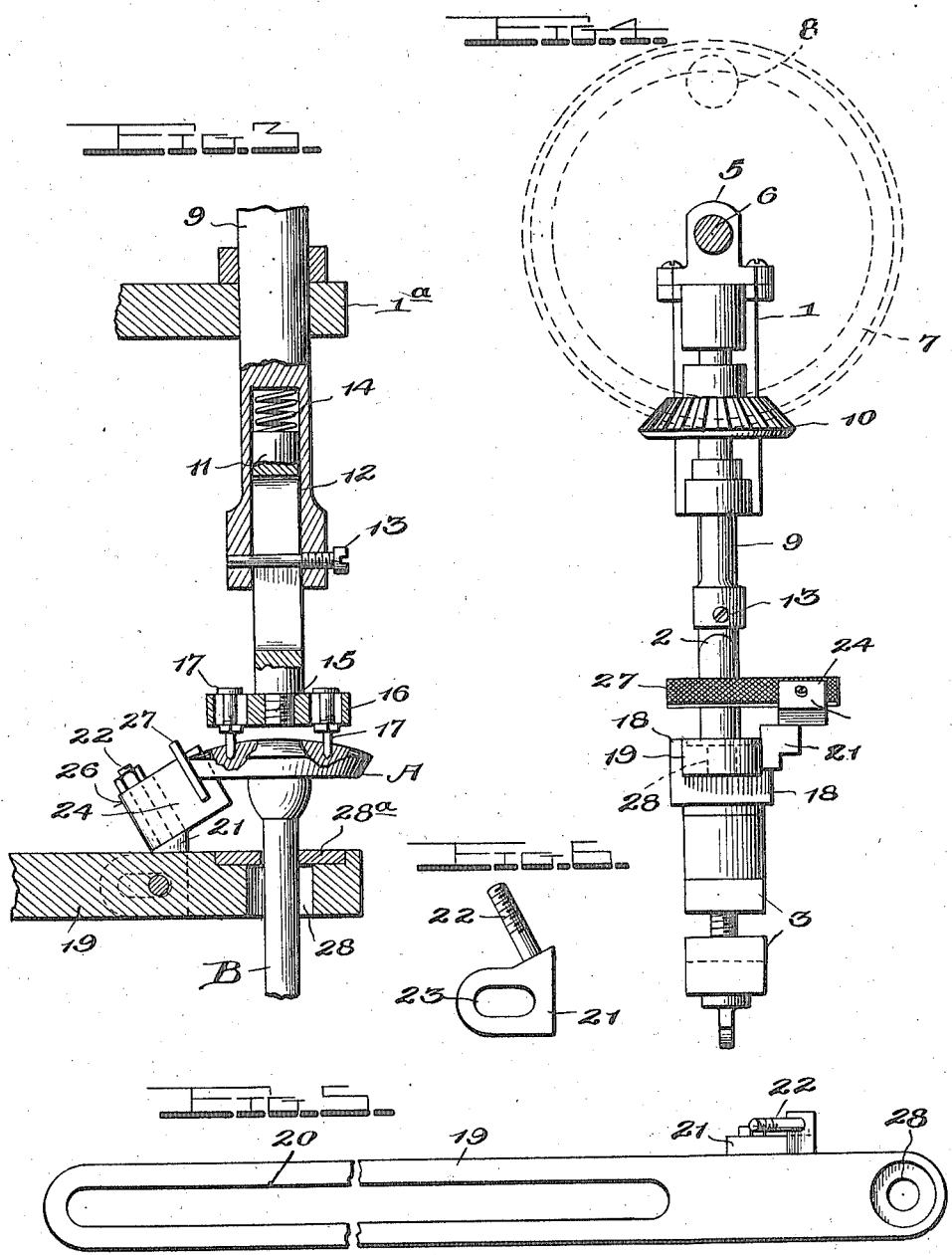

WILLIAM C. McDONALD, OF COLUMBUS, GEORGIA, ASSIGNOR OF ONE-THIRD TO BRICK S. MILLER AND ONE-THIRD TO W. CECIL NEILL, BOTH OF COLUMBUS, GEORGIA.

VALVE-DRESSING DEVICE.

1,181,908.  Specification of Letters Patent.  Patented May 2, 1916.

Application filed December 8, 1915. Serial No. 65,712.

*To all whom it may concern:*

Be it known that I, WILLIAM C. McDONALD, a citizen of the United States, residing at Columbus, in the county of Muscogee and State of Georgia, have invented certain new and useful Improvements in Valve-Dressing Devices, of which the following is a specification.

This invention relates to a device for dressing automobile valves and their seats, the operations being successive, and performed by substantially the same mechanism. A perfect fit is therefore obtained with less labor and time and more certainty than if the dressing was limited to the seat or valve alone.

The invention consists in the novel features of construction hereinafter described, pointed out in the claims and shown in the accompanying drawings in which:—

Figure 1 is a side elevation, a part being broken away. Fig. 2 is a plan view. Fig. 3 is a detail sectional view, a valve being shown in dressing position. Fig. 4 is a front elevation. Fig. 5 is a plan view, partly broken out, of a slidable support. Fig. 6 is a side elevation of a support holder. Fig. 7 is a perspective view of a file support. Fig. 8 is an elevation of a modified form of valve engaging pin.

In constructing my device I provide a suitable frame 1 adjustably mounted on an angled standard 2, which in turn is carried by a suitable clamp 3 adapted to secure the standard to an engine base or casing. At its rear end the frame 1 is provided with a vertically arranged sleeve 4 which receives the upper vertical portion of the standard 2 so that the entire frame 1 may be swung to left or right or raised or lowered with respect to the part to which the clamp 3 is secured. On the frame 1 are bearings 5 for a horizontal shaft 6 on the forward end of which is a bevel gear wheel 7, having a handle 8. Journaled in the frame 1 and an arm 1ª of the frame, is a vertical shaft 9 on which is fixed a bevel gear wheel 10 meshing with the gear 7.

As shown in Fig. 3 the lower end of the shaft 9 is recessed and working in said recess is a pin 11, said pin being slotted as shown at 12 and a pin 13 extends through said slot, thereby preventing the pin turning with respect to the shaft 9, but permitting vertical movement. A spring 14 is seated in the upper end of the recess and bears on the upper end of the pin 11. The pin has a lower reduced threaded portion 15 which carries a plate 16, and said plate carries two pins 17 adapted to engage the usual small sockets formed in valves.

Locked on the lower vertical portion of the angled standard 2 is a channeled plate 18 and a support 19 is slidably mounted in said channelway. This support as shown in detail in Fig. 5 is longitudinally slotted as at 20, the standard passing through said slot and the support is secured to said standard by a suitable set screw 32, so as to lock the support in adjusted position.

A block 21 carries, at an angle to the perpendicular, a screw or threaded pin 22, and said block is slotted as at 23, so that the block may be adjustably secured, as by a set screw, to one side of the support 19, and adjacent its forward end. This block forms a holder for a file support, shown in detail in Fig. 7. The file support consists of a block 24 grooved at 25 to receive the file, 27, also secured in place by a set screw, and the block has adjacent one corner a lug 26 provided with a suitable smooth bore 26ª adapted to engage the screw or pin 22. At its forward end the support 19 has a countersunk opening 28. In actual practice I make this opening $\frac{7}{16}$ of an inch in diameter with the countersunk portion 1 inch in diameter and $\frac{1}{8}$th of an inch deep. A washer 28ª is placed in the countersunk portion and the opening in the washer corresponds to the size of the stem B of a valve A. It is understood that several of these washers are employed with openings of varying sizes to fit different valve stems.

Some valves are not provided with the sockets above mentioned but are provided with a central slot similar to a screw-head. To hold such valves I employ a pin 29, having a longitudinal groove 30 and a wedge-shaped point 31. Where the valve is provided only with the one slot this pin is substituted for the pin 11 and plate 16.

To dress an automobile valve and its seat the operation is as follows:—The machine is suitably clamped to the engine casing by the clamp 3 and the valve to be dressed is removed. The support 19 is then adjusted so that the opening 28 will be over the valve seat, and fastened in place by the set screw 32. A washer 28ª of the proper size is placed in the countersunk portion of the opening 28 and the valve stem B inserted therein. A suitable filing or other abrasive instrument is placed in the file support, and said support and its holder properly adjusted to the right angle for the work to be done. The frame 1 is then brought into position, being lowered on the standard 2 to give the desired pressure on the valve, the pins 17 or, if used, the pin 29, engaging and turning the valve. The spring 14 acts as a cushion and applies the proper pressure, regulated by adjustment of the frame 1 vertically, and by turning the gear wheel 7 the shaft 9, the part carried thereby and the valve will be turned, the abrasive device being in engagement with that portion of the valve to be dressed. When the necessary dressing has been accomplished, the valve is removed, a suitable paste (forming no part of the present invention) is placed on the valve seat, and the valve reseated. The valve is then again engaged by the pins 17 or pin 29, and this time turned forward and backward thus dressing the seat to exactly fit the valve. When the seat has been properly dressed the device is then removed by loosening the clamp 3.

What I claim is:—

1. In a device of the kind described, a standard, a channeled plate secured transversely on the standard, a valve support slidably carried on said plate, and having a countersunk opening adapted to receive a valve stem, a frame adjustably carried by the standard, a vertical shaft carried by the frame, and spring pressed means carried by the lower end of said shaft and adapted to engage the valve, together with means carried by the frame for rotating said shaft and valve engaging means.

2. In a valve dressing device, a standard, means for clamping the standard to an engine base, a plate carried by the standard, a valve support slidably carried by said plate, and having a countersunk opening adjacent one end, a washer adapted to fit in said countersunk portion and to receive a valve stem, an adjustable holder carried by the side of the valve support and adjacent said opening, a supporting block carried by said holder, an abrasive material carried by said block, and means supported from said standard for rotating the valve.

3. In a valve dressing device, means for supporting a valve to be dressed adjacent an abrasive material, a vertically movable frame, a depending shaft carried by the frame and having its lower end recessed, valve engaging means seated in said recess, a spring arranged in said recess and bearing downwardly on said valve engaging means, the pressure of the spring being regulated by adjustment of the frame, and means carried by the frame for rotating said shaft.

4. In a device of the kind described, an angled standard, a frame having a vertical sleeve at one end, said sleeve fitting on the upper vertical portion of the standard, a longitudinally grooved plate secured transversely on the lower vertical portion of the standard, a longitudinally slotted, valve-supporting member slidably held in the groove of the plate, the standard passing loosely through the slot of said member, means for locking said member in adjusting position to the standard, means for securing the frame in adjusted position to the standard, adjustable means carried by a side of the valve supporting member for holding an abrasive material, a shaft mounted on the frame, a drive gear thereon, a second shaft carried by the frame at right angles to the first mentioned shaft, a gear thereon meshing with the first mentioned gear, and spring pressed valve engaging means slidably keyed in the lower portion of the second mentioned shaft.

5. In a device of the kind described, a vertically adjustable frame, valve engaging and rotating means carried thereby, comprising a hollow rotatable shaft and a slotted spring-pressed pin working in and projecting from said shaft, a horizontally slidable valve support, said support having a countersunk opening, interchangeable washers adapted to rest in said opening and receive a valve stem, and adjustable means carried by said support and adapted to hold an abrasive material at an angle to and against one side of said valve.

In testimony whereof I affix my signature in the presence of two witnesses.

WILLIAM C. McDONALD.

Witnesses:
W. N. JONES,
M. K. BAGLEY.

Copies of this patent may be obtained for five cents each, by addressing the "Commissioner of Patents. Washington, D. C."